(12) United States Patent
Brock (10) Patent No.: US 10,909,590 B2
(45) Date of Patent: Feb. 2, 2021

(54) MERCHANT AND ITEM RATINGS

(71) Applicant: Square, Inc., San Francisco, CA (US)

(72) Inventor: Zachary Brock, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 16/292,165

(22) Filed: Mar. 4, 2019

(65) Prior Publication Data

US 2019/0205951 A1 Jul. 4, 2019

Related U.S. Application Data

(63) Continuation of application No. 13/841,254, filed on Mar. 15, 2013, now abandoned.

(51) Int. Cl.
*G06Q 30/02* (2012.01)

(52) U.S. Cl.
CPC ............................ *G06Q 30/0282* (2013.01)

(58) Field of Classification Search
CPC .................................................. G06Q 30/0282
USPC .................................................... 705/347
See application file for complete search history.

(56) References Cited

U.S. PATENT DOCUMENTS

| | | | |
|---|---|---|---|
| 5,257,348 A | 10/1993 | Roskowski et al. | |
| 5,860,073 A | 1/1999 | Ferrel et al. | |
| 6,026,375 A | 2/2000 | Hall et al. | |
| 6,281,897 B1 | 8/2001 | Berry et al. | |
| 6,381,603 B1 | 4/2002 | Chan et al. | |
| 6,408,292 B1 | 6/2002 | Bakalash et al. | |
| 6,587,835 B1 | 7/2003 | Treyz et al. | |
| 6,772,132 B1 | 8/2004 | Kemp, II et al. | |
| 6,776,304 B2 | 8/2004 | Liff et al. | |
| D513,511 S | 1/2006 | Decombe | |
| D528,556 S | 9/2006 | Decombe | |
| 7,249,708 B2 | 7/2007 | McConnell et al. | |
| 7,319,978 B2 | 1/2008 | Minamishin et al. | |

(Continued)

FOREIGN PATENT DOCUMENTS

| | | |
|---|---|---|
| KR | 10-2004-0081672 A | 9/2004 |
| WO | 2012/162125 A1 | 11/2012 |
| WO | 2013/184844 A2 | 12/2013 |

OTHER PUBLICATIONS

Matt Mickiewicz, "How to Track Global Search Trends," Mar. 22, 2006, available at: http://www.sitepoint.com/how-to-track-global-search-trends/ (Year: 2006).*

(Continued)

*Primary Examiner* — Andrew B Whitaker
*Assistant Examiner* — Johnathan J Lindsey, III
(74) *Attorney, Agent, or Firm* — Polsinelli PC (57) ABSTRACT

Methods, systems, and apparatus, including computer programs encoded on computer storage media, for determining merchant and item ratings. One of the methods includes obtaining information identifying one or more purchase transactions by users at a physical location of a merchant. One or more statistical signals are computed using the information identifying the one or more purchase transactions by the users. A quality score for the merchant is computed based on the one or more statistical signals. A rating for the merchant is computed based on the quality score.

16 Claims, 5 Drawing Sheets

(56) References Cited

U.S. PATENT DOCUMENTS

| | | | |
|---|---|---|---|
| D590,412 S | 4/2009 | Saft et al. | |
| D604,320 S | 11/2009 | Hoefnagels | |
| D608,364 S | 1/2010 | Walsh et al. | |
| D619,146 S | 7/2010 | Flik et al. | |
| 7,792,709 B1 | 9/2010 | Trandal et al. | |
| 7,797,724 B2 | 9/2010 | Calvin | |
| 7,848,765 B2 | 12/2010 | Phillips et al. | |
| D633,921 S | 3/2011 | Brinda | |
| 7,930,624 B2 | 4/2011 | Phillips et al. | |
| D640,269 S | 6/2011 | Chen | |
| 7,991,665 B2 | 8/2011 | Hafner et al. | |
| 8,024,267 B2 | 9/2011 | Olliphant et al. | |
| 8,090,351 B2 | 1/2012 | Klein | |
| 8,126,779 B2 * | 2/2012 | Wanker | G06Q 30/0623 705/26.1 |
| 8,135,624 B1 | 3/2012 | Ramalingam et al. | |
| 8,140,418 B1 | 3/2012 | Casey et al. | |
| 8,150,844 B2 * | 4/2012 | Redstone | H04L 67/18 707/724 |
| 8,175,908 B1 * | 5/2012 | Anderson | G06Q 30/0201 705/7.29 |
| D666,209 S | 8/2012 | Cranfill | |
| 8,239,276 B2 | 8/2012 | Lin et al. | |
| D666,630 S | 9/2012 | LeVee et al. | |
| 8,266,014 B1 | 9/2012 | Bhosle et al. | |
| 8,285,592 B2 | 10/2012 | Tomchek et al. | |
| 8,285,604 B1 | 10/2012 | Trandal et al. | |
| 8,369,842 B2 | 2/2013 | Proctor, Jr. et al. | |
| 8,370,062 B1 * | 2/2013 | Starenky | G06Q 30/0261 701/467 |
| 8,417,258 B2 | 4/2013 | Barnes, Jr. | |
| 8,463,295 B1 | 6/2013 | Caralis et al. | |
| 8,554,670 B1 | 10/2013 | Blank et al. | |
| 8,645,222 B1 | 2/2014 | Tamassia et al. | |
| 8,666,895 B2 | 3/2014 | Grigg et al. | |
| 8,725,597 B2 | 5/2014 | Mauseth et al. | |
| 8,751,316 B1 | 6/2014 | Fletchall et al. | |
| 8,777,104 B1 | 7/2014 | Brock et al. | |
| 8,967,471 B1 | 3/2015 | Rosenthal et al. | |
| 9,031,866 B1 | 5/2015 | Ng et al. | |
| 9,189,809 B1 | 11/2015 | Shieh et al. | |
| 9,373,112 B1 | 6/2016 | Henderson et al. | |
| D788,152 S | 5/2017 | Ovaice | |
| 9,648,451 B1 | 5/2017 | Lee | |
| 9,652,791 B1 | 5/2017 | Brock | |
| 9,741,045 B1 | 8/2017 | Henderson et al. | |
| 9,934,523 B1 | 4/2018 | Brock | |
| 1,037,322 A1 | 8/2018 | Brock | |
| 2002/0111172 A1 * | 8/2002 | DeWolf | G06Q 30/02 455/456.3 |
| 2002/0111907 A1 | 8/2002 | Ling | |
| 2002/0147656 A1 | 10/2002 | Tam et al. | |
| 2002/0160817 A1 | 10/2002 | Salmimaa et al. | |
| 2002/0194121 A1 | 12/2002 | Takayama | |
| 2003/0004743 A1 | 1/2003 | Callegari | |
| 2005/0216371 A1 | 9/2005 | Fotteler et al. | |
| 2006/0053392 A1 | 3/2006 | Salmimaa et al. | |
| 2006/0093998 A1 | 5/2006 | Vertegaal | |
| 2006/0123014 A1 * | 6/2006 | Ng | G06F 16/951 |
| 2006/0161599 A1 | 7/2006 | Rosen | |
| 2007/0022375 A1 | 1/2007 | Walker | |
| 2007/0136140 A1 | 6/2007 | Smith, Jr. | |
| 2007/0136750 A1 | 6/2007 | Abanami et al. | |
| 2007/0150354 A1 | 6/2007 | Walker et al. | |
| 2007/0150414 A1 | 6/2007 | Templeton | |
| 2007/0209023 A1 | 9/2007 | Nakagawa et al. | |
| 2007/0290039 A1 | 12/2007 | Pfleging et al. | |
| 2008/0033817 A1 | 2/2008 | Billmaier et al. | |
| 2008/0080682 A1 | 4/2008 | Ogunwale et al. | |
| 2008/0142599 A1 | 6/2008 | Benillouche et al. | |
| 2008/0147507 A1 | 6/2008 | Langhammer | |
| 2008/0147773 A1 | 6/2008 | Aaron | |
| 2008/0162296 A1 | 7/2008 | Hanif et al. | |
| 2008/0207296 A1 | 8/2008 | Lutnick et al. | |
| 2008/0263455 A1 | 10/2008 | Stults et al. | |
| 2008/0319843 A1 | 12/2008 | Moser et al. | |
| 2009/0030787 A1 | 1/2009 | Pon et al. | |
| 2009/0037502 A1 | 2/2009 | Gupta et al. | |
| 2009/0043696 A1 | 2/2009 | Ornce et al. | |
| 2009/0063247 A1 * | 3/2009 | Burgess | G06Q 30/02 705/7.34 |
| 2009/0063304 A1 | 3/2009 | Meggs | |
| 2009/0076896 A1 | 3/2009 | DeWitt et al. | |
| 2009/0076925 A1 | 3/2009 | DeWitt et al. | |
| 2009/0077493 A1 | 3/2009 | Hempel et al. | |
| 2009/0125429 A1 | 5/2009 | Takayama | |
| 2009/0171842 A1 | 7/2009 | Blythe | |
| 2009/0177581 A1 | 7/2009 | Garcia et al. | |
| 2009/0216676 A1 | 8/2009 | Mathur et al. | |
| 2009/0241026 A1 | 9/2009 | Augustine et al. | |
| 2009/0264070 A1 | 10/2009 | Lim | |
| 2009/0298514 A1 | 12/2009 | Ullah | |
| 2009/0313138 A1 | 12/2009 | Ratnakar | |
| 2010/0051689 A1 | 3/2010 | Diamond | |
| 2010/0070369 A1 | 3/2010 | Fenton et al. | |
| 2010/0082445 A1 | 4/2010 | Hodge et al. | |
| 2010/0082455 A1 | 4/2010 | Rosenblatt et al. | |
| 2010/0082487 A1 | 4/2010 | Nelsen | |
| 2010/0115460 A1 | 5/2010 | Pegg | |
| 2010/0125495 A1 | 5/2010 | Smith et al. | |
| 2010/0125510 A1 | 5/2010 | Smith et al. | |
| 2010/0137004 A1 | 6/2010 | Ron et al. | |
| 2010/0161400 A1 | 6/2010 | Snodgrass et al. | |
| 2010/0174596 A1 | 7/2010 | Gilman et al. | |
| 2010/0269059 A1 | 10/2010 | Othmer et al. | |
| 2010/0306080 A1 | 12/2010 | Trandal et al. | |
| 2011/0016051 A1 | 1/2011 | Trifiletti et al. | |
| 2011/0029416 A1 | 2/2011 | Greenspan | |
| 2011/0054981 A1 | 3/2011 | Faith et al. | |
| 2011/0057957 A1 | 3/2011 | Kasahara | |
| 2011/0059784 A1 | 3/2011 | Lutnick et al. | |
| 2011/0153440 A1 | 6/2011 | Singhal | |
| 2011/0231292 A1 | 9/2011 | McCown | |
| 2011/0238476 A1 | 9/2011 | Carr et al. | |
| 2011/0238517 A1 | 9/2011 | Ramalingam et al. | |
| 2011/0251892 A1 | 10/2011 | Laracey | |
| 2011/0258058 A1 | 10/2011 | Carroll et al. | |
| 2011/0264501 A1 | 10/2011 | Clyne | |
| 2011/0276418 A1 | 11/2011 | Velani | |
| 2012/0010930 A1 | 1/2012 | Langdon et al. | |
| 2012/0016731 A1 | 1/2012 | Smith et al. | |
| 2012/0078751 A1 | 3/2012 | MacPhail et al. | |
| 2012/0084117 A1 | 4/2012 | Tavares et al. | |
| 2012/0089461 A1 | 4/2012 | Greenspan | |
| 2012/0089470 A1 | 4/2012 | Barnes, Jr. | |
| 2012/0109749 A1 * | 5/2012 | Subramanian | G06Q 30/0255 705/14.53 |
| 2012/0109752 A1 | 5/2012 | Strutton et al. | |
| 2012/0130790 A1 | 5/2012 | Lyons et al. | |
| 2012/0130794 A1 | 5/2012 | Strieder | |
| 2012/0130917 A1 * | 5/2012 | Forsblom | G06Q 30/0625 705/347 |
| 2012/0150605 A1 | 6/2012 | Isaacson et al. | |
| 2012/0150611 A1 | 6/2012 | Isaacson et al. | |
| 2012/0158500 A1 | 6/2012 | Hochstatter et al. | |
| 2012/0166432 A1 * | 6/2012 | Tseng | G06Q 30/0261 707/728 |
| 2012/0179516 A1 | 7/2012 | Fakhrai et al. | |
| 2012/0190386 A1 | 7/2012 | Anderson | |
| 2012/0191603 A1 | 7/2012 | Nuzzi | |
| 2012/0197724 A1 | 8/2012 | Kendall | |
| 2012/0203632 A1 | 8/2012 | Blum et al. | |
| 2012/0209685 A1 | 8/2012 | Nealer et al. | |
| 2012/0221421 A1 | 8/2012 | Hammad | |
| 2012/0232994 A1 | 9/2012 | Kim et al. | |
| 2012/0252418 A1 | 10/2012 | Kandekar et al. | |
| 2012/0271692 A1 | 10/2012 | Huang et al. | |
| 2012/0290376 A1 | 11/2012 | Dryer et al. | |
| 2012/0290449 A1 | 11/2012 | Mullen et al. | |
| 2012/0296724 A1 * | 11/2012 | Faro | G06Q 30/00 705/14.27 |
| 2012/0303425 A1 | 11/2012 | Katzin et al. | |
| 2012/0316989 A1 | 12/2012 | Wong et al. | |

(56) References Cited

U.S. PATENT DOCUMENTS

| | | |
|---|---|---|
| 2012/0330769 A1 | 12/2012 | Arceo |
| 2013/0013499 A1 | 1/2013 | Kalgi |
| 2013/0030913 A1 | 1/2013 | Zhu et al. |
| 2013/0036048 A1 | 2/2013 | Campos et al. |
| 2013/0036051 A1 | 2/2013 | Giordano et al. |
| 2013/0046589 A1 | 2/2013 | Grigg et al. |
| 2013/0054367 A1 | 2/2013 | Grigg et al. |
| 2013/0060623 A1 | 3/2013 | Walker et al. |
| 2013/0080280 A1 | 3/2013 | Scipioni |
| 2013/0085860 A1 | 4/2013 | Summers et al. |
| 2013/0090957 A1 | 4/2013 | Popkey et al. |
| 2013/0103760 A1 | 4/2013 | Golding et al. |
| 2013/0117155 A1 | 5/2013 | Glasgo |
| 2013/0132274 A1 | 5/2013 | Henderson et al. |
| 2013/0138500 A1 | 5/2013 | Charaniya et al. |
| 2013/0144674 A1 | 6/2013 | Kim et al. |
| 2013/0144702 A1 | 6/2013 | Tabor et al. |
| 2013/0151419 A1 | 6/2013 | Hitchcock et al. |
| 2013/0159086 A1 | 6/2013 | Richard |
| 2013/0159119 A1 | 6/2013 | Henderson et al. |
| 2013/0173320 A1* | 7/2013 | Bank ............... G06Q 20/00 705/7.11 |
| 2013/0191173 A1 | 7/2013 | Shobola |
| 2013/0191199 A1 | 7/2013 | Corner |
| 2013/0198076 A1 | 8/2013 | Zambelli Hosmer et al. |
| 2013/0218683 A1 | 8/2013 | Hannan |
| 2013/0275222 A1 | 10/2013 | Amaro et al. |
| 2013/0275303 A1 | 10/2013 | Fiore et al. |
| 2013/0282488 A1 | 10/2013 | Blum et al. |
| 2013/0282490 A1 | 10/2013 | Kramer et al. |
| 2014/0052524 A1 | 2/2014 | Andersen |
| 2014/0052615 A1 | 2/2014 | Andersen |
| 2014/0108290 A1* | 4/2014 | Zamani ............ G06Q 30/0282 705/347 |
| 2014/0330628 A1 | 11/2014 | Chen et al. |
| 2014/0337175 A1 | 11/2014 | Katzin et al. |
| 2015/0332223 A1 | 11/2015 | Aaron et al. |
| 2015/0332237 A1 | 11/2015 | Aaron et al. |

OTHER PUBLICATIONS

U.S. Appl. No. 16/292,165 NPL—EIC 3600 Search Report—dated Mar. 24, 2020 (Year: 2020).*

U.S. Appl. No. 16/292,165 NPL—EIC 3600 Search Report—dated Jun. 23, 2020 (Year: 2020).*

U.S. Appl. No. 16/292,165 NPL—EIC 3600 Search Report—dated Aug. 27, 2020 (Year: 2020).*

Matt Mickiewicz ("How to Track Global Search Trends," Mar. 22, 2006, http://www.sitepoint.com/how-to-track-global-search-trends/) (Year: 2006).*

"Uber—Android Apps on Google Play," dated Nov. 10, 2014, Retrieved from the internet URL: https://play.google.com/store/apps/details?id=com.ubercab&hl=en, on Nov. 12, 2014, pp. 2.

Fried, I., "Stampt Aims to Take the Coffee Shop Punch Card Digital," dated Jul. 20, 2011, Retrieved from the Internet URL: http://allthingsd.com/20110720/stampt-aims-to-take-the coffee-shop-punch-card-digital/, on Nov. 16, 2015, pp. 1-3.

Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.

Reitz, S., "TabbedOut: The Iphone App that lets you close your Tab without really opening one," dated Apr. 9, 2012, retrieved from the Internet URL: http://www.dallasobserver.com/restaurants/tabbedout-theiphone-app-that-lets-you-close-your-tab-without-really-opening-one-7025599, on Nov. 19, 2015, pp. 1-2.

Shaivitz, M., "MICROS Announces Partnership with TabbedOut: Big Nod for Mobile Payment Acceptance," dated May 11, 2011, Retrieved from the Internet URL: http://tech.co/micros-tabbedout-2011-05, on Nov. 16, 2015, pp. 1-5.

Siegler, MG., "MobilePay May Be The Death Of The Wallet. Yes, For Real This Time," TechCrunch, dated Sep. 28, 2010, Retrieved from the internet URL: http:/ /techcrunch.com/2010/09/28/mobilepayusa/, on Sep. 22, 2013, pp. 12.

Walsh, M., "Stampt App to End Paper Loyalty Cards," dated Jul. 24, 2011, Retrieved from the Internet URL: http://loyalty360.org/resources/article/stampt-app-to-end-paper-loyalty-cards, on Nov. 16, 2015, pp. 1-6.

Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 7, 2014, pp. 1-3.

"ARC; ARC Releases Aero Trend to Support Financial Industry," Journal of Transportation, pp. 1-2, (Sep. 10, 2011).

Angel, G., "Using card transaction data," American Demographics—AdAge, published Aug. 1, 1998, Retrieved from the Internet URL: http://adage.com/article/american-demographics/card-transaction-data/43213/, pp. 1-10.

Mickiewicz, M., "How-to Track Global Search Trends," Sitepoint, dated Mar. 22, 2006, Retrieved from the Internet URL: http://www.sitepoint.com/how-to-track-global-search-trends/, p. 1.

Non-Final Office Action dated Aug. 23, 2013, for U.S. Appl. No. 13/627,615, of Henderson, W., et al., filed Sep. 26, 2012.

Final Office Action dated Dec. 23, 2013, for U.S. Appl. No. 13/627,615, of Henderson, W., et al., filed Sep. 26, 2012.

Non-Final Office Action dated Jun. 3, 2014, for U.S. Appl. No. 29/449,712, of Ovaice, A.W., filed Mar. 15, 2013.

Non-Final Office Action dated Jul. 31, 2014, for U.S. Appl. No. 13/911,030, of Andersen, R., filed Jun. 5, 2013.

Non-Final Office Action dated Sep. 23, 2014, for U.S. Appl. No. 13/627,615, of Henderson, W., et al., filed Sep. 26, 2012.

Final Office Action dated Dec. 18, 2014, for U.S. Appl. No. 13/627,615, of Henderson, W., et al., filed Sep. 26, 2012.

Non-Final Office Action dated Apr. 8, 2015, for U.S. Appl. No. 13/791,565, of Shieh, J., et al., filed Mar. 8, 2013.

Advisory Action dated May 4, 2015, for U.S. Appl. No. 13/627,615, of Henderson, W., et al., filed Sep. 26, 2012.

Non-Final Office Action dated May 11, 2015, for U.S. Appl. No. 13/800,349, of Henderson, W., et al., filed Mar. 13, 2013.

Final Office Action dated May 26, 2015, for U.S. Appl. No. 13/911,030, of Andersen, R., filed Jun. 5, 2013.

Non-Final Office Action dated May 29, 2015, for U.S. Appl. No. 13/627,602, of Henderson, W., et al., filed Sep. 26, 2012.

Non-Final Office Action dated Jun. 23, 2015, for U.S. Appl. No. 13/763,504, of Brock, Z., filed Feb. 8, 2013.

Final Office Action dated Jul. 1, 2015, for U.S. Appl. No. 13/791,565, of Shieh, J., et al., filed Mar. 8, 2013.

Non-Final Office Action dated Aug. 12, 2015, for U.S. Appl. No. 13/627,615, of Henderson, W., et al., filed Sep. 26, 2012.

Notice of Allowance dated Sep. 14, 2015, for U.S. Appl. No. 13/791,565, of Shieh, J., et al., filed Mar. 8, 2013.

Final Office Action dated Oct. 16, 2015, for U.S. Appl. No. 13/800,349, of Henderson, W., et al., filed Mar. 13, 2013.

Non-Final Office Action dated Dec. 3, 2015, for U.S. Appl. No. 13/911,039, of Andersen, R., filed Jun. 5, 2013.

Final Office Action dated Dec. 3, 2015, for U.S. Appl. No. 29/449,712, of Ovaice, A.W., filed Mar. 15, 2013.

Final Office Action dated Dec. 4, 2015, for U.S. Appl. No. 13/627,602, of Henderson, W., et al., filed Sep. 26, 2012.

Final Office Action dated Jan. 4, 2016, for U.S. Appl. No. 13/763,504, of Brock, Z., filed Feb. 8, 2013.

Non Final Office Action dated Feb. 29, 2016, for U.S. Appl. No. 14/491,774, of Lee, B., filed Sep. 19, 2014.

Notice of Allowance dated Mar. 1, 2016, for U.S. Appl. No. 13/627,615, of Henderson, W., et al., filed Sep. 26, 2012.

Advisory Action dated Mar. 9, 2016, for U.S. Appl. No. 29/449,712, of Ovaice, A.W., filed Mar. 15, 2013.

Non-Final Office Action dated Mar. 14, 2016, for U.S. Appl. No. 13/841,254, of Brock, Z., filed Mar. 15, 2013.

Final Office Action dated Jun. 3, 2016, for U.S. Appl. No. 13/911,039, of Andersen, R., filed Jun. 5, 2013.

Non-Final Office Action dated Jul. 14, 2016, for U.S. Appl. No. 29/449,712, of Ovaice, A.W., filed Mar. 15, 2013.

Final Office Action dated Aug. 17, 2016, for U.S. Appl. No. 14/491,774, of Lee, B., filed Sep. 19, 2014.

(56) References Cited

OTHER PUBLICATIONS

Non-Final Office Action dated Aug. 23, 2016, for U.S. Appl. No. 13/800,349, of Henderson, W., et al., filed Mar. 13, 2013.
Non-Final Office Action dated Aug. 29, 2016, for U.S. Appl. No. 13/627,602, of Henderson, W., et al., filed Sep. 26, 2012.
Non-Final Office Action dated Sep. 12, 2016, for U.S. Appl. No. 13/763,504, of Brock, Z., filed Feb. 8, 2013.
Non-Final Office Action dated Oct. 7, 2016, for U.S. Appl. No. 13/786,403, of Brock, Z., filed Mar. 5, 2013.
Final Office Action dated Oct. 21, 2016, for U.S. Appl. No. 13/841,254, of Brock, Z., filed Mar. 15, 2013.
Advisory Action dated Oct. 26, 2016, for U.S. Appl. No. 14/491,774, of Lee, B. filed Sep. 19, 2014.
Non-Final Office Action dated Nov. 3, 2016, for U.S. Appl. No. 13/911,030, of Andersen, R., filed Jun. 5, 2013.
Non-Final Office Action dated Nov. 7, 2016, for U.S. Appl. No. 13/911,039, of Andersen, R., filed Jun. 5, 2013.
Notice of Allowance dated Dec. 14, 2016, for U.S. Appl. No. 14/491,774, of Lee, B., filed Sep. 19, 2014.
Notice of Allowance dated Jan. 6, 2017, for U.S. Appl. No. 13/763,504, of Brock, Z., filed Feb. 8, 2013.
Notice of Allowance dated Jan. 20, 2017, for U.S. Appl. No. 29/449,712, of Ovaice, A.W., filed Mar. 15, 2013.
Final Office Action dated Mar. 21, 2017, for U.S. Appl. No. 13/800,349, of Henderson, W., et al., filed Mar. 13, 2013.
Notice of Allowance dated Apr. 12, 2017, for U.S. Appl. No. 13/627,602, of Henderson, W., et al., filed Sep. 26, 2012.
Final Office Action dated May 18, 2017, for U.S. Appl. No. 13/911,030, of Andersen, R., filed Jun. 5, 2013.
Final Office Action dated Jun. 5, 2017, for U.S. Appl. No. 13/911,039, of Andersen, R., filed Jun. 5, 2013.
Final Office Action dated Jun. 6, 2017, for U.S. Appl. No. 13/786,403, of Brock, Z., filed Mar. 5, 2013.
Non-Final Office Action dated Jun. 15, 2017, for U.S. Appl. No. 13/841,254, of Brock, Z., filed Mar. 15, 2013.
EIC 3600 Search Report dated Jun. 15, 2017, for U.S. Appl. No. 13/841,254, of Brock, Z., filed Mar. 15, 2013.
Non-Final Office Action dated Oct. 4, 2017, for U.S. Appl. No. 13/800,349, of Henderson, W., et al., filed Mar. 13, 2013.
Final Office Action dated Oct. 6, 2017, for U.S. Appl. No. 13/841,254, of Brock, Z., filed Mar. 15, 2013.
Notice of Allowance dated Nov. 17, 2017, for U.S. Appl. No. 13/786,403, of Brock, Z., filed Mar. 5, 2013.
Non-Final Office Action dated Jan. 11, 2018, for U.S. Appl. No. 13/911,039, of Andersen, R., filed Jun. 5, 2013.
Non-Final Office Action dated Feb. 23, 2018, for U.S. Appl. No. 13/841,254, of Brock, Z., filed Mar. 15, 2013.
Final Office Action dated Apr. 19, 2018, for U.S. Appl. No. 13/800,349, of Henderson, W., et al., filed Mar. 13, 2013.
Non-Final Office Action dated May 15, 2018, for U.S. Appl. No. 15/913,250, of Brock, Z., filed Mar. 6, 2018.
Advisory Action dated Aug. 23, 2018, for U.S. Appl. No. 13/800,349, of Henderson, W., et al., filed Mar. 13, 2013.
Final Office Action dated Sep. 4, 2018, for U.S. Appl. No. 13/911,039, of Andersen, R., filed Jun. 5, 2013.
Non-Final Office Action dated Sep. 5, 2018, for U.S. Appl. No. 13/911,030, of Andersen, R., filed Jun. 5, 2013.
Final Office Action dated Nov. 2, 2018, for U.S. Appl. No. 13/841,254, of Brock, Z., filed Mar. 15, 2013.
Final Office Action dated Oct. 2, 2018, for U.S. Appl. No. 15/913,250, of Brock, Z., filed Mar. 6, 2018.
Notice of Allowance dated Mar. 20, 2019, for U.S. Appl. No. 15/913,250, of Brock, Z., filed Mar. 6, 2018.
Final Office Action dated Apr. 5, 2019, for U.S. Appl. No. 13/911,030, of Andersea, R., filed Jun. 5, 2013.
Advisory Action dated Jul. 1, 2019, for U.S. Appl. No. 13/911,030 of Andersen, R., filed Jun. 5, 2013.
International search report and Written Opinion for International Application No. PCT/US2013/044376 dated Nov. 26, 2013.

\* cited by examiner

MERCHANT AND ITEM RATINGS

This application claims priority to and is a continuation of U.S. patent application Ser. No. 13/841,254, filed on Mar. 15, 2013, entitled "MERCHANT AND ITEM RATINGS," the entirety of which is herein incorporated by reference.

TECHNICAL FIELD

This disclosure relates to rating merchants and items sold by merchants.

BACKGROUND

When searching for merchants, a user can enter a search query into a search engine. The search query can include a merchant's name or a name of a desired product or service. The user can limit the search by location. The search engine can return results to the user in response to the search query and any limitations provided by the user. To perform a transaction (e.g., a purchase) with a merchant in the search results, the user must visit the merchant's retail store or the merchant's online shopping portal.

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

This specification relates to determining ratings for a merchant and for items sold by the merchant based on purchase transactions conducted by users at the merchant's place of business. The purchase transaction information can be used to directly compute a merchant rating that indicates a level of quality of the merchant as well as item ratings that indicate a level of quality of items sold by the merchant. The ratings can be computed even without using ratings input by human raters.

In general, one innovative aspect of the subject matter described in this specification can be embodied in methods that include the actions of obtaining information identifying one or more purchase transactions by users at a physical location of a merchant; computing one or more statistical signals using the information identifying the one or more purchase transactions by the users; computing a quality score for the merchant based on the one or more statistical signals; and determining a rating for the merchant based on the quality score. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Computing one or more statistical signals using the information identifying the one or more purchase transactions by the users comprises computing a repeat visit rate based on a measure of a number of repeat visits by a particular user compared to measure of a length of time between visits by the particular user. Computing one or more statistical signals using the information identifying the one or more purchase transactions by the users comprises computing a referral rate based on a measure of a number of visits to the merchant by one or more social contacts of the user, after the user visited the merchant at least once. Computing one or more statistical signals using the information identifying the one or more purchase transactions by the users comprises computing an average distance between the physical location of the merchant and respective addresses associated with the users. Computing one or more statistical signals using the information identifying the one or more purchase transactions by the users comprises obtaining information identifying one or more other purchase transactions by the user at physical locations of one or more other merchants; obtaining one or more respective quality scores of the one or more other merchants; and computing a user-merchant score based on the one or more quality respective scores of the one or more other merchants. Computing one or more statistical signals using the information identifying the one or more purchase transactions by the users comprises computing a chargeback rate based on a measure of a number of chargebacks by the merchant compared to measure of a length of time between chargebacks by the merchant. Computing one or more statistical signals using the information identifying the one or more purchase transactions by the users comprises computing a total transaction volume based on a measure of total transactions by the merchant. Computing one or more statistical signals using the information identifying the one or more purchase transactions by the users comprises computing a transaction rate based on a measure of a number of transactions during a particular time period. Computing one or more statistical signals using the information identifying the one or more purchase transactions by the users comprises computing a search volume based on a measure of user searches for the merchant.

In general, another innovative aspect of the subject matter described in this specification can be embodied in methods that include the actions of obtaining information identifying one or more purchase transactions of an item by users at a physical location of a merchant; computing one or more statistical signals using the information identifying the one or more purchase transactions of the item by the users; computing a quality score for the item based on the one or more statistical signals; and determining a rating for the item based on the quality score. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Computing one or more statistical signals using the information identifying the one or more purchase transactions of the item by the users comprises computing a repeat buy rate for the item based on a measure of a number of purchase transactions of the item by a particular user compared to measure of a length of time between purchase transactions of the item by the user. Computing one or more statistical signals using the information identifying the one or more purchase transactions of the item by the users comprises computing a change in the repeat buy rate for the item based on a comparison of the repeat buy rate in a first time period to a repeat buy rate in a second time period. Computing one or more statistical signals using the information identifying the one or more purchase transactions of the item by the users comprises computing a relative buy rate for the item based on a comparison of purchases of the item to purchases of other items in a same category in the merchant's inventory.

Advantages may include one or more of the following. Users can be provided with more accurate merchant and item rating information that is directly based on what customers actually buy and merchants that they actually visit. Displayed merchant ratings can exhibit greater variability than traditional rating schemes that can suffer from little variability.

BRIEF DESCRIPTION OF THE DRAWINGS

Like reference numbers and designations in the various drawings indicate like elements.

DETAILED DESCRIPTION

As an overview, the system provides information about merchants and items sold by merchants using information that describes items purchased in purchase transactions conducted by a merchant. In general, the system can use information about purchase transactions to compute a variety of statistical signals for the merchant as well as individual items sold by the merchant. The system can then use the statistical signals to compute a rating or some other measure of quality for the merchant or items sold by the merchant.

The system can then generate a presentation of merchant and item ratings in a web browser or in a smartphone application, for example, to give users a sense for the quality of merchants and the items sold by the merchants.

Such information can be generated by a payment service system that processes payment transactions on behalf of merchants. The examples below will relate to payment service systems generally, although other systems that do not process payment transactions can also generate and provide such data. Other systems can obtain such data from a payment service system or from other sources, e.g. from their own records of purchase transactions. A payment service system can give merchants who use the service as well as users conducting the purchase transactions the opportunity to opt-in or opt-out of having their purchase transactions used in this way.

A payment service system allows a user (also called a customer or payer) to purchase items from a merchant while physically present at the merchant, e.g., at the point of sale, or online, e.g. through a merchant's website. Some payment service systems process cardless payment transactions. A cardless payment transaction is one where a user conducts the transaction with a merchant at a point of sale or online by using a financial account without physically presenting or otherwise providing information about a payment card to the merchant at the point of sale. In fact, the merchant need not receive any details about the financial account, e.g., the credit card issuer, credit card number, and the like is not provided to the merchant.

From the user's perspective, the user first signs up for an account with the payment service system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the payment service system.

To conduct cardless payment transactions with a merchant at the point of sale, the user can give consent to perform a cardless payment transaction with the merchant. After the user gives consent, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant.

Figure 1:
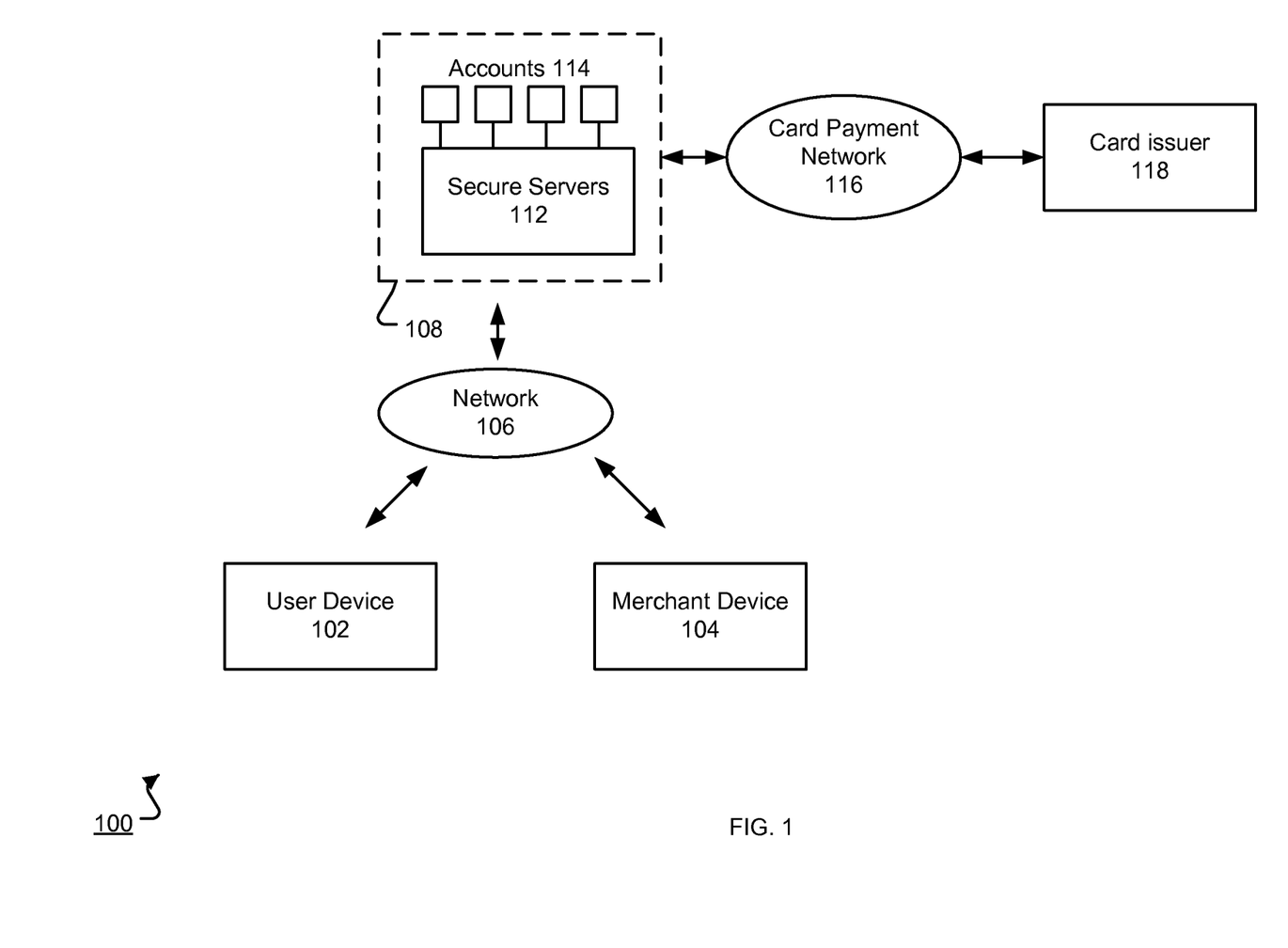
FIG. 1 is a schematic illustration of the architecture of an example payment system.

FIG. 1 is a schematic illustration of the architecture of an example payment system 100. The overall system 100 includes a user device 102, a merchant device 104, and a payment service system 108 connected to a network, e.g., the Internet 106. The user device 102 is a computing device capable of running software applications. For example, the user device 102 can be a desktop computer, laptop computer, smartphone, or tablet computer. The merchant device 104 is also a computing device, capable of processing transactions. The merchant device 104 can be a mobile device, a server, a desktop computer, a laptop computer, a dedicated point of sale system, or other data processing apparatus. By using the payment service system 108, the user device 102 and merchant device 104 can conduct a payment transaction, for example a cardless or online payment transaction.

The user and merchant devices can communicate with the payment service system 108 using the network 106. The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user can be provided to the merchant at the point of sale so that the merchant can compare the photo to the person. In addition, the payment service system 108 can require a personal identification number (PIN) to be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

The payment service system can help facilitate sales of products by providing information about ratings or other measures of quality of merchants and items sold by merchants derived from information about items sold in purchase transactions conducted by the merchants. The system can for example provide a merchant directory that includes information about merchants who use the payment service system to conduct payment transactions. In some implementations, the merchant directory includes an individual merchant page for each merchant. The merchant page can be in any appropriate presentation format, for example, a HTML page renderable by a web browser or information presented by a mobile application running on a mobile user device.

The payment service system can generate merchant pages in the merchant directory that list ratings of items sold in purchase transactions conducted by the merchant, either at the point of sale or online. Such information can facilitate future sales by providing other users with suggestions of items that they may want to purchase and by giving other users indications of merchants and items that are popular with users.

Figure 2:
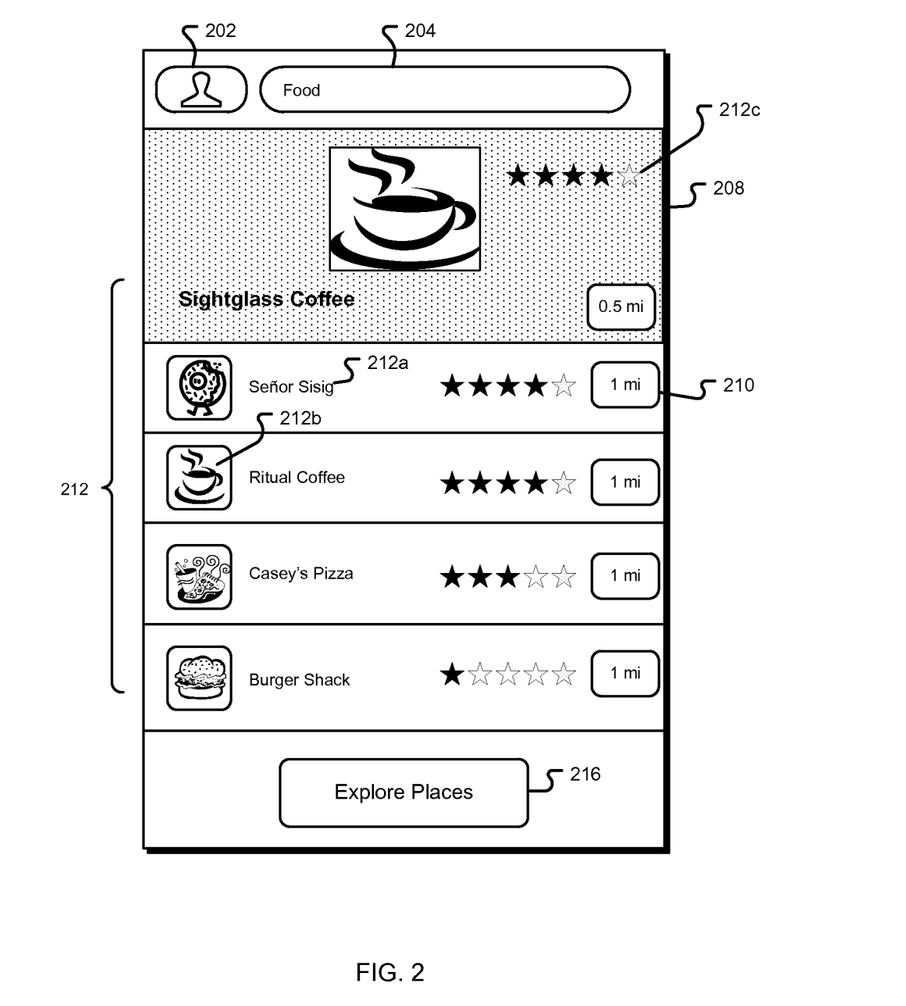
FIG. 2 is a diagram of an example view of an interface of a user application installed on a mobile user device.

FIG. 2 is a diagram of an example view of an interface of a user application installed on a mobile user device. A user can use the example interface shown in FIG. 2 to issue a query to the user application, e.g. using search bar 204. In response to receiving the query, the user application can retrieve a list of merchants 212.

Upon receiving a query in search bar 204, the application can obtain a list of merchants and can display the list of merchants 212 on a display of the user device. The list of merchants can be organized into a plurality of rows, each row containing the name 212a of a single merchant. The list can also include an icon 212b for each merchant, e.g., located in the row with the name of the merchant. For example, each merchant's icon 212b can be located on the left side of the name 212a of the merchant. In some implementations, a cover image 208 for a merchant, e.g., the first merchant in the list, is displayed. The application can display a distance 210 that a merchant is from a current location of the mobile device. Again, the distance 210 can be located in the row with the name 212a of the merchant, e.g., on the right side of the name 212 of the merchant.

The application can also display a rating 212c associated with every merchant. In this example, the rating is shown as a number of stars out of a possible five stars. The merchant "Sightglass Coffee," for example, has a rating of four stars out of five. The rating shown can be in the form of a variety of other indicators as well, for example, a numerical value from 1 to 10, an enumerated classification, e.g. "good" or "poor," or a color-coded rating, to name just a few possible examples.

The ratings 212c associated with each merchant can be derived directly from information about purchase transactions conducted by the merchant, rather than solely from explicit ratings provided by human raters. A system may still use human ratings to derive ratings 212c.

A payment service system can use information about purchase transactions conducted at the merchant's physical location, e.g. the location indicated by the example interface shown in FIG. 2. Thus, if a business has multiple locations, the system can compute a different rating for each location using purchase transaction information particular to each location.

The application can also represent each merchant with a custom-designed "card". In some implementations, tapping the row containing the name 212a of the merchant, or tapping the name 212a of the merchant, will cause the user's mobile device to display more information regarding the respective merchant. In some implementations, the additional merchant information is represented by a custom-designed merchant page. For example, the mobile device can display a map around the merchant's area, the merchant's phone number, the merchant's operating hours, or other merchant information. The application can also present user account information in response to the user tapping an account button 202.

The application also allows the user to "Explore Places" 216. In some implementations, this opens a list of nearby or featured merchants that are associated with the payment system. A user then has an option to learn more about one of the merchants in the list.

Figure 3:
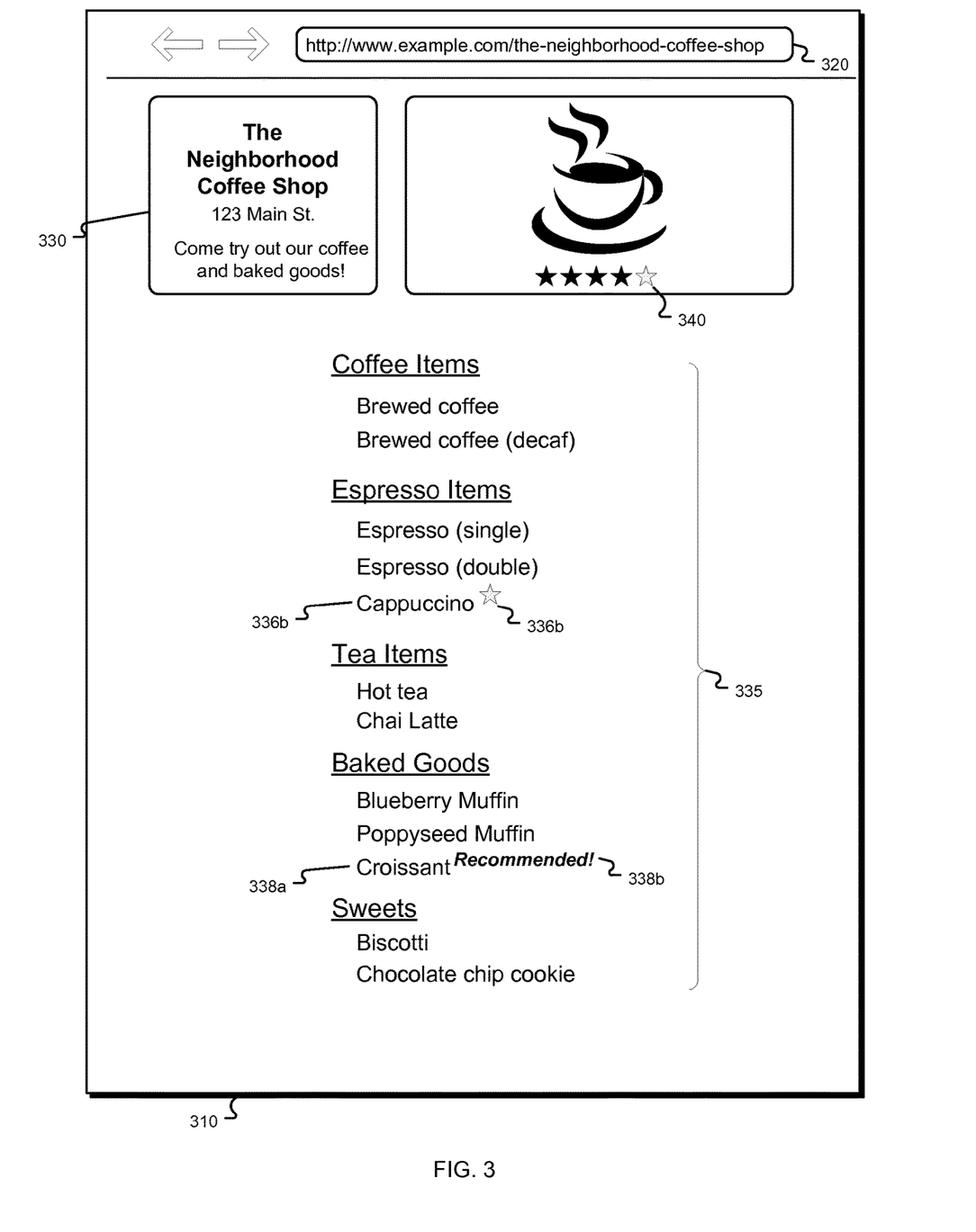
FIG. 3 is a diagram of an example presentation of merchant information.

FIG. 3 is a diagram of an example presentation 310 of merchant information. The example presentation 210 can be part of a merchant directory, which can be provided and maintained for example by a payment service system. Users can search for merchants on a search interface page, e.g., by proximity and/or type of good or service provided. The search interface page can provide links to individual merchant-specific pages. The payment service system can provide information about a particular merchant on a merchant-specific page. For example, the system can maintain a web page accessible over the Internet for each merchant.

The example presentation 310 can be presented by a web browser that has navigated to a merchant-specific page of a merchant directory. The address bar 320 of the browser includes a URL that corresponds to a directory page of a merchant maintained by the system. The directory page includes general merchant information 330 as well as menu items 235 sold by the merchant. Although the example presentation 310 in FIG. 3 relates to only one merchant, the payment service system can also generate other presentations that include information about multiple merchants selected based on a variety of factors, which can include, for example, merchant categories, locations, and user search queries.

The merchant directory page also includes a rating 340 associated with the merchant. In this example, the rating is in the form of a number of stars out of a possible five stars, though as mentioned above with reference to FIG. 2, the rating can also be in variety of other forms.

The example presentation 310 also includes indicators of quality for some of the items available for purchase at the merchant's place of business. For example, item 336b includes a quality indicator 336b. The quality indicator 336b can indicate that the item 336b is a popular, well-liked, or recommended item for purchase. In this example, the quality indicator 336b is a star icon, although any other indicator or rating can alternatively be used. Similarly, item 338a includes a quality indicator 338b that is in the form of "Recommended!" text indicating that the item is recommended.

As described above with reference to FIG. 2, the item quality indicators or ratings can be derived directory from information about purchase transactions conducted by the merchant, rather than from explicit ratings provided by human raters, although explicit human ratings can also be used.

Figure 4:
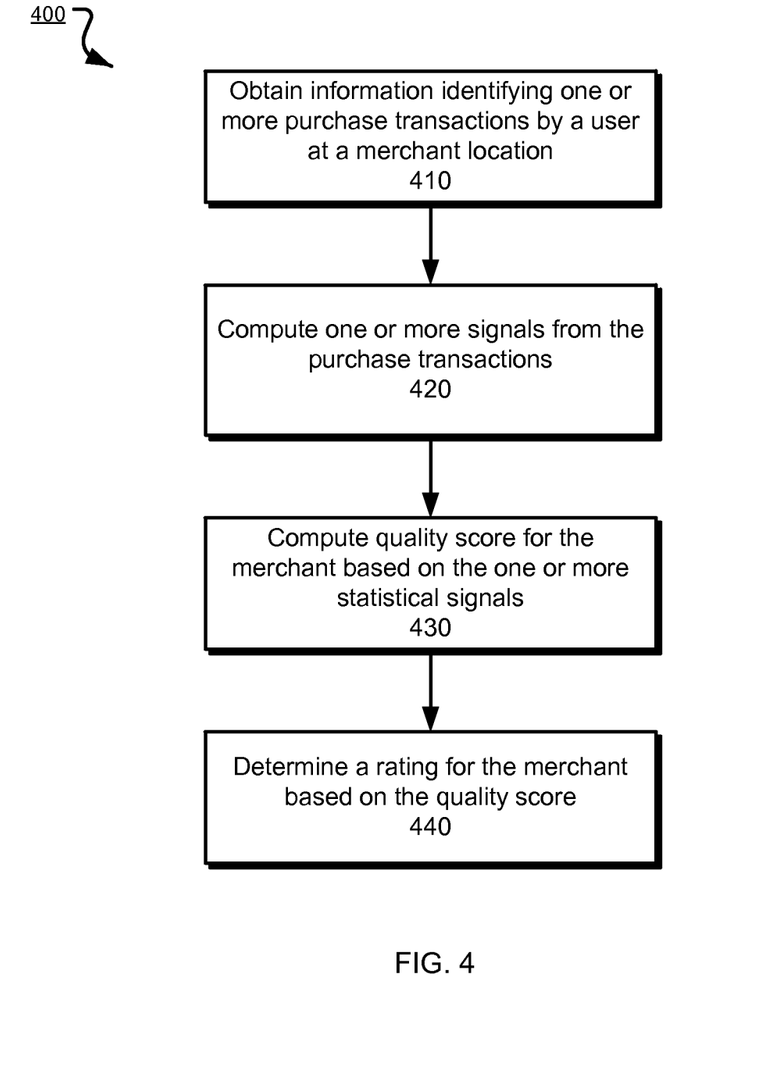
FIG. 4 is a flow chart of an example process for determining a merchant rating.

FIG. 4 is a flow chart of an example process 400 for determining a merchant rating. In general, a payment service system obtains information pertaining to purchase transactions conducted by a merchant and generates one or more merchant-level statistical signals from the purchase transactions. For convenience, the process 400 will be described as being performed by a system of one or more computers, e.g. the payment service system 108 of FIG. 1.

The system generally will compute the statistical signals using data for a least a threshold minimum number of users who have visited the merchant. The system can impose the threshold minimum to ensure reliability of the data and also to ensure user anonymity when computing the merchant ratings.

When computing the signals, the system will also generally compute a variety of measures of central tendency of the data. While the examples below may refer to the system computing an "average," this may refer to any of an arithmetic, geometric, or harmonic mean of the measurements, a median of the measurements, or a mode of the measurements, or any other appropriate statistical measurement. In addition, the system need not use all user transaction data for computing any particular signal. The system can, for example, use samples of the data, discard outliers, or process the data in some other way before computing the signals.

The system obtains information identifying one or more purchase transactions conducted by users at a merchant location (410). The system can for example obtain information describing purchase transactions conducted by users at a merchant's physical place of business. In some implementations, the system uses information about transactions conducted during a recent time period, e.g. during the last month or last year. Conventional credit card processors have access to data including a merchant's name, a total transaction amount, and a date. In addition to this data, the system can also access information that includes data about itemized purchases at merchants. The itemized purchase data can include a name for each item purchased, a stock-keeping unit (SKU) to uniquely identify items, universal product code (UPC), or a price for each item. Merchants can provide an inventory of item information, e.g., an item's price, name, SKU or other details, to the system. In some implementations, merchants provide this information during creation of a merchant account.

In some implementations, the system updates each user's purchase history whenever the user conducts a payment transaction. In some implementations, purchase history information can be acquired from transactions linked to financial accounts of each user in a payment service system, e.g., a payment service system as described in reference to FIG. 1. Again, each user can opt-in to share previous purchase history with the ranking system. In addition, the system can anonymize the data that is stored in various ways. For example, the system can replace user-identifiable information, e.g., a user's name, with a numeric identifier. The system can also replace a user's address with anonymized location information, e.g. a city or GPS coordinates.

The system computes one or more statistical signals from the purchase transactions (420). The system can compute a variety of merchant-level signals based on transactions conducted by the users at the merchant's location.

One example signal that the system can compute is a repeat visit rate. In general, the repeat visit rate represents how frequently a typical user returns to the merchant's location to conduct another transaction. The system can consider a high repeat visit rate to be a positive indication of quality for the merchant.

In some implementations, the system computes a number of repeat visits by each user during a particular time period. The system can then compute a measure of a typical length of time between visits by a user, e.g. an average length of time. The system can represent the repeat visit rate as a typical number of days between repeat visits by a user, or a typical number of repeat visits by a user during a particular time period, e.g. during one month.

Another example signal that the system can compute is a repeat visit percentage. In general, the repeat visit percentage represents what percentage share of users returned to the merchant to conduct another transaction. The system can consider a high repeat visit percentage to be a positive indication of quality for the merchant.

In some implementations, the system computes a number of users that visited the merchant only once in the purchase transaction data compared to a number of users that visited the merchant at least twice.

Another example signal that the system can compute is a referral rate. In general, the referral rate represents how frequently other social contacts users visited the merchant after the users themselves visited the merchant. A user can for example opt-in to allowing the system to access social contacts of the user on one or more social networks. The system can then obtain purchase transactions by social contacts of the user that also have accounts with the system and that have also visited the merchant. The system can consider a high number of social contacts of a user visiting the merchant after the user visits the merchant to be a positive indication of quality for the merchant.

In some implementations, the system computes a number of visits to the merchant by social contacts of each user after the user has visited the merchant at least once. The system can also impose a time window on visits by the social contacts. For example, the system may only count visits by social contacts if the visits occurred within a particular time period, e.g., one week or one month, of a visit by the corresponding user.

In some implementations, system also computes a referral rate according to how likely it is that any social contacts of a particular user visit the merchant within a particular time period. For example, the system can determine that after a particular user visits, there is a 10% chance on average that a social contact of the user will visit the merchant within a particular time period, e.g. within a week or within a month.

Another example signal that the system can compute is a travel distance. In general, the travel distance represents how far users travel on average to visit the merchant. The system can consider a high travel distance to be a positive indication of quality for the merchant.

In some implementations, the system computes the travel distance using an address associated with each user account to compute a distance between the address and the merchant's physical location. The system can then compute an average distance from the individual user distances.

Another example signal that the system can compute is a user-merchant score. In general, the user-merchant score represents a typical quality rating of other merchants that the users have also visited. The system can consider a high user-merchant score to be a positive indication of quality for the merchant. In other words, if a user typically visits high-quality merchants, the user's visit to the merchant can be a positive sign of quality for the merchant.

In some implementations, the system obtains merchant quality scores for a number of other merchants that each user has visited. The system can then compute the user-merchant score as an average of the merchant quality scores. In some implementations, the system limits the merchants that the users have visited to a recent time period, e.g., other merchants the users have visited within the last month or the last year.

Another example signal that the system can compute is a chargeback rate. A "chargeback" refers to an instance of a user's using bank forcibly reversing the result of a purchase transaction. A chargeback can be initiated due to technical errors, insufficient funds, duplicate billing, consumer complaints, fraud, or identity theft. In general, the chargeback rate represents how often the merchant is subject to chargebacks. The system can consider a low chargeback rate to be a positive indication of quality for the merchant.

In some implementations, the system computes number of chargebacks that occurred during one or more time periods. The system can then compute an average chargeback rate, represented as either an average period of time between chargebacks or average number of chargebacks during a particular time period.

Another example signal that the system can compute is a transaction volume. For example, the system can compute a monetary total of purchase transactions conducted by the merchant during a particular time period. The system can consider a high transaction volume to be a positive indication of quality for the merchant.

Another example signal that the system can compute is a transaction rate. The transaction rate can represent a number of transactions conducted during a particular time period. The system can consider a high transaction rate to be a positive indication of quality for the merchant.

Another example signal that the system can compute is a search volume. In general, the search volume represents a number of user searches for the merchant during a particular time period. The system can count queries received at an online merchant directory, for example, or queries received through a mobile application. The system can consider a high search volume to be a positive indication of quality for the merchant.

The system computes a quality score for the merchant based on the one or more statistical signals (430). The system will generally transform each the raw signals in some way and then combine the transformed signals into a single quality score that represents a measure of quality for the merchant.

The quality score generally represents a measure of users' satisfaction with their experience at the merchant and can be used as a proxy for explicit user ratings or reviews of a particular merchant. In other words, the quality score is intended to measure satisfaction and value provided by a merchant as indicated by user behavior, and not, e.g. popularity of any particular merchant or item.

The system can transform a raw signal score for example by comparing the raw signal score to a reference score. For example, the system can compare a repeat visit rate to a reference repeat visit rate, which can be, for example, an average repeat visit rate for all merchants or all merchants in a particular category or in a particular geographic location. The system can also normalize the signal scores, e.g. so that all scores are transformed to a value between 0 and 1, or apply some other transformation function to the raw signal scores, e.g. a sigmoid function that transitions rapidly from negative to positive or vice versa around a particular value.

The system can then combine the transformed scores into a single quality score for the merchant. For example, the system can assign weights to each of the signals and compute a weighted average of all the signals used. The system can also use any appropriate machine learning techniques to assign weights to the signals.

The system determines a rating for the merchant based on the quality score (440). After computing a score for the merchant, the system can determine a rating for the merchant based on the merchant quality scores. For example, the system can partition a range of scores and assign a different star rating to each partition. If the scores have been normalized to be on a scale between 0 and 100, the system can for example, assign one star to scores from 0-20, two stars to scores from 20-40, three stars to scores from 40-60, four stars to scores from 60-80, and five stars to scores from 80-100. Alternatively, the system can assign a rating of a numerical value between 0 and 10. The system can then use the assigned rating in various graphical presentations as described above with reference to FIGS. 2 and 3.

Figure 5:
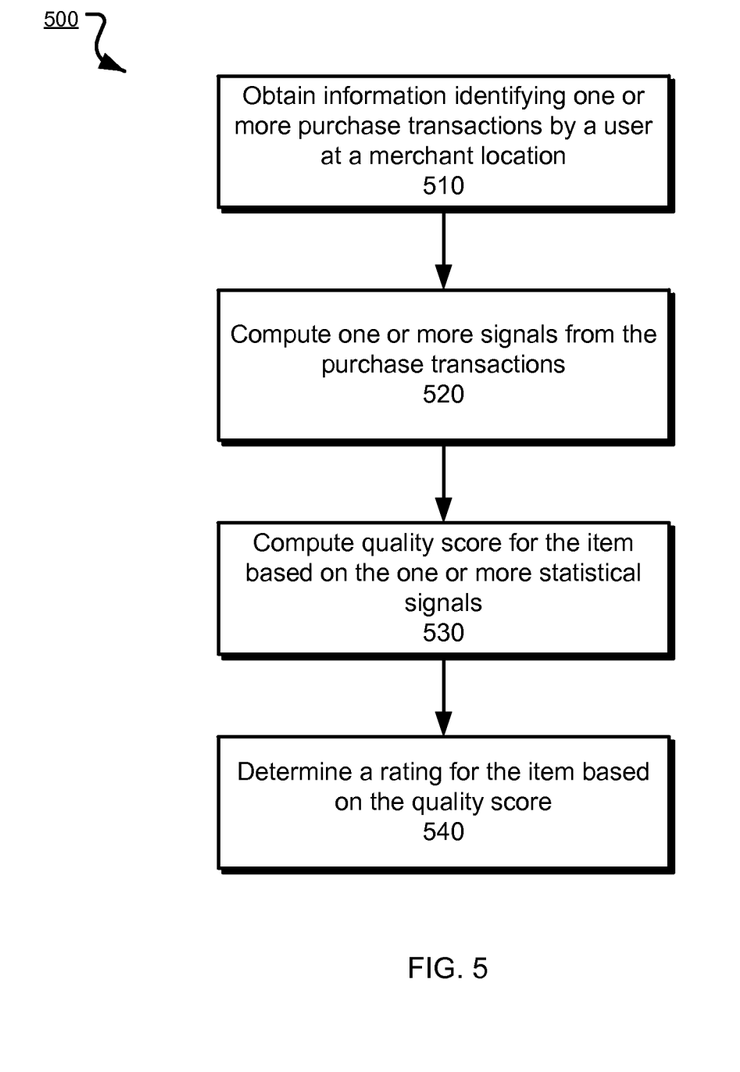
FIG. 5 is a flow chart of an example process for determining an item rating.

FIG. 5 is a flow chart of an example process 500 for determining an item rating. In general, a payment service system obtains information pertaining to purchase transactions conducted by a merchant and generates one or more item-level statistical signals from the purchase transactions. For convenience, the process 500 will be described as being performed by a system of one or more computers, e.g. the payment service system 108 of FIG. 1.

The system obtains information identifying one or more purchase transactions conducted by users at a merchant location (510). As described above with reference to FIG. 4, the system can obtain data describing users' purchase history that includes itemized information about items purchased in each purchase transaction, e.g. the item's price, name, SKU or other details.

The system computes one or more statistical signals from the purchase transactions (520). The system can compute a variety of item-level signals based on transactions conducted by users at the merchant's location.

One example signal that the system can compute is a repeat buy rate. In general, the repeat visit rate represents how frequency a typical user returns to the merchant's location to purchase a particular item again. The system can consider a high repeat buy rate to be a positive indication of quality for the item.

In some implementations, the system computes a number of repeat buys by each user during a particular time period. The system can then compute a measure of a typical length of time between purchases of the time by a single user. The system can represent the repeat buy rate as a typical number of days between repeat buys by a user, or a typical number of repeat buys by a user during particular time period, e.g. during one month.

Another example signal that the system can compute is a change in the repeat buy rate. An increasing repeat buy rate can represent that users are increasing choosing the item over other items on the menu. In other words, the users may have initially tried out a variety of other items on the menu, but they have decided to stick with purchasing a particular item. On the other hand, a decreased buy rate can represent users trying an item and rejecting it for other items.

Another example signal that the system can compute is a relative buy rate. In general, the relative buy rate represents how much more or less frequency an item is bought compared to other comparable items in the merchant's inventory. For example, if the merchant's inventory lists six desserts, and one of them, e.g. the hot fudge brownie, is bought five times as often as any of the other desserts, the system can assign a higher relative buy rate to the hot fudge brownie than to any of the other desserts. In some implementations, the system computes a percentage share of the item compared to other items in the merchant's inventory or to other items in the same category.

The system computes a quality score for the item based on the one or more statistical signals (530). The system can transform the raw signal scores and combine the transformed scores into a single quality score for the item, e.g., as described above with reference to FIG. 4.

The quality score for an item generally represents a measure of users' satisfaction with their purchase of the item as reflected by their purchasing activity and not, e.g. by explicit user ratings or reviews of a particular item. In other words, the quality score is intended to measure satisfaction and value and not popularity, things that are commonly purchased together, or things that are popular for a particular user. The system determines a rating based on the quality score (540). After computing a score for the item, the system can determine a rating for the item based on the quality score. In some implementations, the system designates a predetermined number of items with the highest scores for the merchant as "recommended" items. The system can also assign star or numerical ratings based on the quality scores as described above with reference to FIG. 4. After determining a rating for the item, the system can use the rating in graphical presentations, for example, as described above with reference to FIG. 3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    maintaining, at a payment service system, a database of transactions between users and merchants, the database including statistics associated with the transactions;
    generating, by the payment service system and based on the statistics in the database, statistical measurements indicative of correlations between the users and the merchants derived from the transactions;
    objectively determining, using a machine-learning algorithm, a corresponding user-customized score for any one of the merchants based on at least a first subset of the statistical measurements corresponding to one or more of the merchants previously visited by a user that are different than the one of the merchants and a second subset of the statistical measurements corresponding to the one of the merchants, wherein the machine-learning algorithm is configured to determine the corresponding user-customized score by assigning weights to the first and second subsets of the statistical measurements;
    determining a user-customized rating for each of the merchants based at least in part on the corresponding user-customized score;
    receiving, at the payment service system, a query for nearby merchants from a device associated with the user;
    in response to receiving the query and based at least on a location of the device associated with the user, determining a group of the merchants that are relevant to the query; and
    generating, by the payment service system, a graphical user interface to be displayed on the device, the graphical user interface displaying a corresponding user-customized rating for each merchant of the group of the merchants.

2. The method of claim 1, wherein the statistics include information types of items purchased, purchase frequencies of items, locations and times of items purchased, merchants at which the items are purchased, types of items sold by merchants, visit frequencies at each merchant, purchased items associated with each user and times at which items are purchased by each user.

3. The method of claim 1, wherein the second subset of the statistical measurements include one or more of:
    a repeat visit rate for the one of the merchants based at least in part on a measure of a number of repeat visits by one or more of the users compared to a measure of a length of time between visits by the one or more of the users;
    a referral rate associated with the one of the merchants based at least in part on a measure of a number of visits to the one of the merchants by one or more social contacts of the one or more users after the one or more users visited the one of the merchants at least once;
    a chargeback rate associated with the one of the merchants based at least in part on a measure of a number of chargebacks by the one f the merchants compared to a measure of a length of time between chargebacks by the one of the merchants;
    a total transaction volume associated with the one of the merchants based at least in part on a measure of a total number of transactions by the one of the merchants;
    a transaction rate associated with the one of the merchants based at least in part on a measure of a number of transactions during a particular time period; and
    a search volume for the one of the merchants, wherein the search volume is based at least in part on a measure of searches of the corresponding user for the same merchant.

4. The method of claim 1, further comprising:
    assigning a normalized score to each of the first and the second subsets of the statistical measurements to yield a set of scores; and
    determining the corresponding user-customized score based on a weighted combination of the set of scores.

5. A system comprising:
    a payment service system communicatively coupled to a plurality of user devices and a plurality of point of sale devices of a plurality of merchants, the payment service system configured to:

record transactions between users and merchants in a database, the database including statistics associated with the transactions;

generate, based on the statistics in the database, statistical measurements indicative of correlations between the users and the merchants derived from the transactions;

objectively determine using a machine-learning algorithm, a corresponding user-customized score for any one of the merchants based on at least a first subset of the statistical measurements corresponding to one or more of the merchants previously visited by a user that are different than the one of the merchants and a second subset of the statistical measurements corresponding to the one of the merchants, wherein the machine-learning algorithm is configured to determine the corresponding user-customized score by assigning weights to the first and second subsets of the statistical measurements;

determine a user-customized rating for each of the merchants based on the corresponding user-customized score; and generate a graphical user interface to be displayed on a device, the graphical user interface displaying a list of nearby merchants with corresponding user-customized ratings.

6. The system of claim 5, wherein the statistics include information types of items purchased, purchase frequencies of items, locations and times of items purchased, merchants at which the items are purchased, types of items sold by merchants, visit frequencies at each merchant, purchased items associated with each user and times at which items are purchased by each user.

7. The system of claim 5, wherein the second subset of the statistical measurements include one or more of:

a repeat visit rate for the one of the merchants based at least in part on a measure of a number of repeat visits by one or more of the users compared to a measure of a length of time between visits by the one or more of the users;

a referral rate associated with the one of the merchants based at least in part on a measure of a number of visits to the one of the merchants by one or more social contacts of the one or more users after the one or more users visited the corresponding merchant at least once;

a chargeback rate associated with the one of the merchants based at least in part on a measure of a number of chargebacks by the one of the merchants compared to a measure of a length of time between chargebacks by the one of the merchants;

a total transaction volume associated with the one of the merchants based at least in part on a measure of a total number of transactions by the one of the merchants;

a transaction rate associated with the one of the merchants based at least in part on a measure of a number of transactions during a particular time period; and a search volume for the one of the merchants, wherein the search volume is based at least in part on a measure of searches of the corresponding user for the same merchant.

8. The system of claim 5, wherein the payment service system is further configured to:

assign a normalized score to each of the first and the second subsets of the statistical measurements associated with a given merchant to yield a set of scores; and determine the corresponding user-customized score based on a weighted combination of the set of scores.

9. The system of claim 5, wherein the payment service system is further configured to:

receive a query from for the list of nearby merchants; and determine one or more of the merchants to be included in the list; and send the list of nearby merchants with the corresponding user-customized ratings to the device.

10. The system of claim 5, wherein each merchant and each user has a corresponding profile with the payment service system including corresponding payment information.

11. One or more non-transitory computer-readable media comprising computer-readable instructions, which when executed by one or more processors of a payment service system, cause the payment service system to:

record transactions between users and merchants in a database, the database including statistics associated with the transactions;

generate, based on the statistics in the database, statistical measurements indicative of correlations between the users and the merchants derived from the transactions;

objectively determine using a machine-learning algorithm, a corresponding user-customized score for any one of the merchants based on at least a first subset of the statistical measurements corresponding to one or more of the merchants previously visited by a user that are different than the one of the merchants and a second subset of the statistical measurements corresponding to the one of the merchants, wherein the machine-learning algorithm is configured to determine the corresponding user-customized score by assigning weights to the first and second subsets of the statistical measurements;

determine a user-customized rating for each of the merchants based on the corresponding user-customized score; and generate a graphical user interface to be displayed on a device, the graphical user interface displaying a list of nearby merchants with corresponding user-customized ratings.

12. The non-transitory computer-readable media of claim 11, wherein the statistics include information types of items purchased, purchase frequencies of items, locations and times of items purchased, merchants at which the items are purchased, types of items sold by merchants, visit frequencies at each merchant, purchased items associated with each user and times at which items are purchased by each user.

13. The non-transitory computer-readable media of claim 11, wherein the second subset of the statistical measurements include one or more of:

a repeat visit rate for the one of the merchants based at least in part on a measure of a number of repeat visits by one or more of the users compared to a measure of a length of time between visits by the one or more of the users;

a referral rate associated with the one of the merchants based at least in part on a measure of a number of visits to the one of the merchants by one or more social contacts of the one or more users after the one or more users visited the corresponding merchant at least once;

a chargeback rate associated with the one of the merchants based at least in part on a measure of a number of chargebacks by the one of the merchants compared to a measure of a length of time between chargebacks by the one of the merchants;

a total transaction volume associated with the one of the merchants based at least in part on a measure of a total number of transactions by the one of the merchants;

a transaction rate associated with the one of the merchants based at least in part on a measure of a number of transactions during a particular time period; and a search volume for the one of the merchants, wherein the search volume is based at least in part on a measure of searches of the corresponding user for the same merchant.

14. The non-transitory computer-readable media of claim 11, wherein execution of the computer-readable instructions by the one or more processors further cause the payment service system to:

assign a normalized score to each of the first and the second subsets of the statistical measurements associated with a given merchant to yield a set of scores; and determine a corresponding at least one user-customized score based on a weighted combination of the set of scores.

15. The non-transitory computer-readable media of claim 11, wherein execution of the computer-readable instructions by the one or more processors further cause the payment service system to:

receive a query from for the list of nearby merchants; and determine one or more of the merchants to be included in the list; and send the list of nearby merchants with the corresponding user-customized ratings to the device.

16. The non-transitory computer-readable media of claim 11, wherein each merchant and each user has a corresponding profile with the payment service system including corresponding payment information.

* * * * *